(12) United States Patent
Ishikawa et al.

(10) Patent No.: US 12,511,115 B2
(45) Date of Patent: Dec. 30, 2025

(54) VEHICLE, SYSTEM, NOTIFICATION CONTROL METHOD, AND NON-TRANSITORY STORAGE MEDIUM

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 18/366,031

(22) Filed: Aug. 7, 2023

(65) Prior Publication Data

US 2024/0086172 A1   Mar. 14, 2024

(30) Foreign Application Priority Data

Sep. 12, 2022   (JP) ................. 2022-144813

(51) Int. Cl.
  *G06F 8/65*   (2018.01)
  *H04W 4/12*   (2009.01)
  *H04W 4/40*   (2018.01)

(52) U.S. Cl.
  CPC ........... *G06F 8/65* (2013.01); *H04W 4/12* (2013.01); *H04W 4/40* (2018.02)

(58) Field of Classification Search
  CPC ............ G06F 8/65; H04W 4/12; H04W 4/40
  See application file for complete search history.

(56) References Cited

U.S. PATENT DOCUMENTS

| | | | |
|---|---|---|---|
| 2013/0263107 A1* | 10/2013 | Hamakawa | G06F 8/65 717/168 |
| 2017/0139698 A1* | 5/2017 | Muroyama | G06F 8/656 |
| 2019/0108014 A1 | 4/2019 | Nakamura et al. | |
| 2019/0163466 A1* | 5/2019 | Kiyama | H04W 4/44 |
| 2020/0034138 A1* | 1/2020 | Ishikawa | H04L 67/12 |
| 2021/0141629 A1* | 5/2021 | Ariga | G06F 8/65 |
| 2022/0283799 A1* | 9/2022 | Hamasaki | G06F 8/61 |
| 2023/0032451 A1* | 2/2023 | Ishikawa | H04W 4/44 |

FOREIGN PATENT DOCUMENTS

| | | | |
|---|---|---|---|
| JP | 2017149323 A | 8/2017 | |
| JP | 2017220092 A | 12/2017 | |

* cited by examiner

*Primary Examiner* — Marina Lee
(74) *Attorney, Agent, or Firm* — Dickinson Wright, PLLC

(57) ABSTRACT

A vehicle of a user that is equipped with an electronic control unit includes one or more processors configured to communicate with an information processing device of the user. The one or more processors are configured to perform control for causing the vehicle to perform notification of a plurality of progresses in an update process of software used in the electronic control unit, perform control for notifying the information processing device of a first progress among the progresses at a first frequency, and perform control for notifying the information processing device of a second progress among the progresses at a second frequency. The second progress is different from the first progress. The second frequency is lower than the first frequency.

9 Claims, 4 Drawing Sheets

VEHICLE, SYSTEM, NOTIFICATION CONTROL METHOD, AND NON-TRANSITORY STORAGE MEDIUM

CROSS-REFERENCE TO RELATED APPLICATION

This application claims priority to Japanese Patent Application No. 2022-144813 filed on Sep. 12, 2022, incorporated herein by reference in its entirety.

BACKGROUND

1. Technical Field

The present disclosure relates to a vehicle, a system, a notification control method, and a non-transitory storage medium.

2. Description of Related Art

Japanese Unexamined Patent Application Publication No. 2017-149323 (JP 2017-149323 A) discloses a vehicle control device that is mounted on a vehicle and that downloads update software (for a vehicle electronic control unit (ECU)) transmitted from a server via a user's mobile device.

SUMMARY

The mobile device may be notified of each of a plurality of progresses in the software update process by the vehicle control device. In this case, power consumption may increase due to communication between the vehicle and the mobile device. Therefore, it is desired to suppress an increase in power consumption due to communication between the vehicle and the mobile device (information processing device).

The present disclosure provides a vehicle, a system, a notification control method, and a non-transitory storage medium that are able to suppress an increase in power consumption due to communication between the vehicle and the information processing 30 device.

In a first aspect of the present disclosure, a vehicle of a user that is equipped with an electronic control unit includes one or more processors configured to communicate with an information processing device of the user. The one or more processors are configured to perform control for causing the vehicle to perform notification of a plurality of progresses in an update process of software used in the electronic control unit. The one or more processors configured to perform control for notifying the information processing device of a first progress among the progresses at a first frequency. The one or more processors are configured to perform control for notifying the information processing device of a second progress among the progresses at a second frequency. The second progress is different from the first progress. The second frequency is lower than the first frequency.

In the vehicle according to the first aspect of the present disclosure, the information processing device is notified of the second progress at the second frequency lower than the first frequency. As a result, the amount of communication between the vehicle and the information processing device can be reduced compared to the amount of communication in the case where the information processing device is notified of the second progress at the first frequency or more. Therefore, it is possible to suppress an increase in power consumption due to communication between the vehicle and the information processing device.

In the vehicle according to the first aspect, the one or more processors may be configured to, when the second progress reaches a predetermined state, perform control for notifying the information processing device that the second progress is in the predetermined state. With this configuration, it is possible to suppress notification of the second progress to the information processing device when the second progress is not in the predetermined state. Therefore, it is possible to easily suppress an increase in power consumption due to communication between the vehicle the information processing device.

In the vehicle according to the first aspect, the one or more processors may be configured to perform control for notifying the information processing device of the second progress in response to a request from the information processing device. With this configuration, it is possible to suppress notification of the second progress to the information processing device in a case where the request from the information processing device has not occurred. Therefore, it is possible to easily suppress an increase in power consumption due to communication between the vehicle the information processing device.

In the vehicle according to the first aspect, the second frequency may be zero times. With this configuration, it is possible to suppress even more an increase in power consumption due to communication between the vehicle and the information processing device.

A system according to a second aspect of the present disclosure includes an information processing device of a user, and a vehicle of the user that is equipped with an electronic control unit. The vehicle is configured to communicate with the information processing device. The vehicle is configured to perform control for notifying the vehicle of a plurality of progresses in an update process of software used in the electronic control unit. The vehicle is configured to perform control for notifying the information processing device of a first progress among the progresses at a first frequency. The vehicle is configured to perform control for notifying the information processing device of a second progress among the progresses at a second frequency. The second progress is different from the first progress. The second frequency is lower than the first frequency.

In the system according to the second aspect of the present disclosure, the information processing device is notified of the second progress at the second frequency lower than the first frequency from the vehicle. As a result, it is possible to provide a system that is able to suppress an increase in power consumption due to communication between the vehicle and the information processing device.

In the system according to the second aspect, the vehicle may be configured to, when the second progress reaches a predetermined state, perform control for notifying the information processing device that the second progress is in the predetermined state.

With this configuration, it is possible to provide a system that is able to easily suppress an increase in power consumption due to communication between the vehicle and the information processing device.

In the system according to the second aspect, the vehicle may be configured to perform control for notifying the information processing device of the second progress in response to a request from the information processing device. With this configuration, it is possible to provide a system that is able to easily suppress an increase in power consumption due to communication between the vehicle and the information processing device.

A notification control method according to a third aspect of the present disclosure is a notification control method for controlling a notification of a plurality of progresses in an update process of software used in an electronic control unit of a vehicle of a user. The notification control method includes: notifying the vehicle of the progresses; notifying an information processing device of the user, of a first progress among the progresses at a first frequency from the vehicle; and notifying the information processing device, of a second progress among the progresses at a second frequency from the vehicle. The second progress is different from the first progress. The second frequency is lower than the first frequency.

In the notification control method according to the third aspect of the present disclosure, the information processing device is notified of the second progress at the second frequency lower than the first frequency from the vehicle, as described above. As a result, it is possible to provide a notification control method that is able to suppress an increase in power consumption due to communication between the vehicle and the information processing device.

A non-transitory storage medium according to a fourth aspect of the present disclosure stores an instruction to cause a vehicle to execute a function as the vehicle according to the first aspect of the present disclosure.

With the present disclosure, it is possible to suppress an increase in power consumption due to communication between the vehicle and the information processing device.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
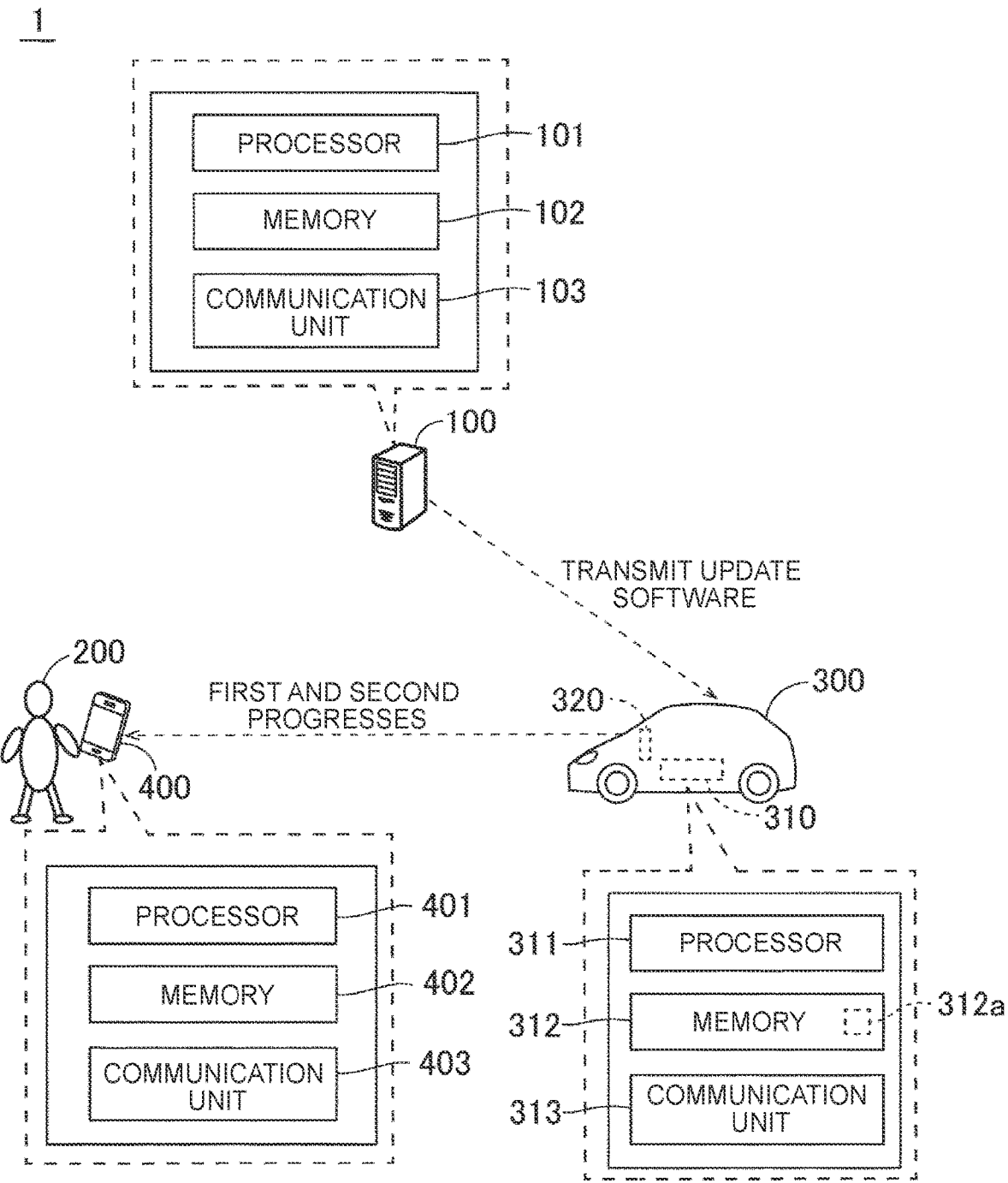
FIG. 1 is a diagram showing a configuration of a notification system according to a first embodiment.

Hereinafter, embodiments of the present disclosure will be described in detail with reference to the drawings. The same or corresponding parts in the drawings are denoted by the same reference signs, and the description thereof will not be repeated.

First Embodiment

FIG. 1 is a diagram showing a configuration of a notification system 1 according to a first embodiment. The notification system 1 includes a server 100, a vehicle 300 of a user 200, and a mobile terminal 400 of the user 200. The mobile terminal 400 includes a smartphone or the like. The mobile terminal 400 is an example of an "information processing device" according to the present disclosure.

The server 100 includes a processor 101, a memory 102, and a communication unit 103. The processor 101 controls the communication unit 103. The memory 102 stores a program to be executed by the processor 101 as well as information used in the program (for example, maps, formulas, and various parameters). The communication unit 103 includes various communication interfaces (I/Fs).

The vehicle 300 is equipped with an electronic control unit (ECU) 310. The ECU 310 includes a processor 311, a memory 312, and a communication unit 313. The memory 312 stores a program to be executed by the processor 311 as well as information used in the program (for example, maps, formulas, and various parameters). The communication unit 313 includes various communication I/Fs. The communication unit 313 may include a data communication module (DCM), or may include a communication I/F compatible with a fifth generation mobile communication system (5G). The communication unit 313 communicates with each of the communication unit 103 of the server 100 and a communication unit 403 of the mobile terminal 400 that will be described later. The processor 311 and the communication unit 313 are examples of a "control unit" and a "communication unit" according to the present disclosure, respectively.

Further, the vehicle 300 includes a display terminal 320. The display terminal 320 includes, for example, a human machine interface (HMI) such as a car navigation system.

The mobile terminal 400 includes a processor 401, a memory 402, and the communication unit 403. The memory 402 stores a program to be executed by the processor 401 as well as information used in the program (for example, maps, formulas, and various parameters). The communication unit 403 includes various communication I/Fs.

The processor 101 of the server 100 controls update of software used in the ECU 310. The processor 101 transmits software of a new version (update software) to the communication unit 313 of the ECU 310 through the communication unit 103. Then, the processor 311 of the ECU 310 installs the received update software and updates the software.

The processor 311 performs control to notify the vehicle 300 of a plurality of progresses in the software update process. Specifically, the processor 311 performs control to display the progresses on the display terminal 320. Further, the processor 311 may display the progresses on a head-up display (not shown). The processor 311 may notify the progresses by audio.

The progresses include a first progress and a second progress that is different from the first progress. The first progress includes, for example, a progress of a software update process (progress rate of installation) in the vehicle 300. The second progress includes, for example, a progress (progress rate) of software transmission from the server 100 to the vehicle 300. Note that each of the first progress and the second progress is not limited to the above example.

The processor 311 performs control to notify the mobile terminal 400 of the first progress at a first frequency. Specifically, the processor 311 performs control to notify the mobile terminal 400 of the first progress every several seconds (for example, every 10 seconds). Note that the above several seconds is the time required for processes of steps S3 to S7 in a sequence diagram (see FIG. 2) described later.

Here, when the mobile terminal 400 is notified of each of the progresses, power consumption (communication load) due to communication between the vehicle 300 and the mobile terminal 400 may increase. Therefore, it is desired to suppress an increase in power consumption due to communication between the vehicle 300 and the mobile terminal 400.

Thus, in the first embodiment, the processor 311 performs control to notify the mobile terminal 400 of the second progress at a second frequency that is lower than the first frequency.

Specifically, the processor 311 performs control to notify the mobile terminal 400 of the second progress when the second progress (progress rate of the software transmission from the server 100 to the vehicle 300) reaches 100%. In other words, the processor 311 notifies the mobile terminal 400 that the software transmission is completed when the second progress (progress rate of the software transmission) reaches 100%. Note that the second progress may be notified to the mobile terminal 400 when the second progress reaches a progress rate other than 100% (for example, 50%).

Further, the processor 311 performs control to notify the mobile terminal 400 of the second progress in response to a request from the mobile terminal 400. Specifically, when the processor 311 acquires a signal requesting disclosure of the second progress from the mobile terminal 400 through the communication unit 313, the processor 311 performs control to notify the mobile terminal 400 of the second progress.

More specifically, the processor 311 performs a process of notifying the mobile terminal 400 of the second progress only once for one signal that is acquired through the communication unit 313. As a result, even when the processes of the steps S3 to S7 (see FIG. 2), which will be described later, are repeated multiple times, it is possible to restrain the second progress notification from being performed multiple times for one signal described above.

The control in the processor 311 is performed by the processor 311 reading and executing a program 312a stored in the memory 312. Although the program 312a itself does not physically exist, the program in the memory 312 is indicated by a reference sign (312a) in FIG. 1 for easy understanding.

Notification Control Method

Next, a notification control method of the above progresses will be described with reference to the sequence diagram of FIG. 2.

First, in step S1, the server 100 transmits the update software used in the ECU 310 to the vehicle 300 through the communication unit 103.

In step S2, the processor 311 of the ECU 310 determines whether an installation process of the update software transmitted from the server 100 in step S1 is being executed in the vehicle 300. When the installation process of the update software is being executed (Yes in S2), the process proceeds to step S3. When the installation process of the update software is not being executed (No in S2), the process ends.

In step S3, the communication unit 403 of the mobile terminal 400 is notified by the processor 311 of the first progress through the communication unit 313.

In step S4, the processor 311 causes the display terminal 320 of the vehicle 300 to display each of the first progress and the second progress.

In step S5, the processor 311 determines whether there is a disclosure request for the second progress from the mobile terminal 400, or whether the second progress is in a predetermined state. When the determination in step S5 is Yes, the process proceeds to step S6. When the determination in step S5 is No, the process proceeds to step S7. In step S6, the processor 311 transmits the second progress to the communication unit 403 of the mobile terminal 400 through the communication unit 313. After that, the process proceeds to step S7.

That is, the processor 311 performs control to notify the mobile terminal 400 of the second progress only when the condition of step S5 regarding the second progress is satisfied. As a result, the frequency at which the second progress is notified to the mobile terminal 400 by the process of step S6 (second frequency) can be easily made lower than the frequency at which the first progress is notified to the mobile terminal 400 by the process of step S3 (first frequency).

Further, the predetermined state includes the state in which the progress (progress rate) of the software transmission from the server 100 to the vehicle 300 has changed to (reached) 100%. Specifically, when the progress rate in the process of the previous step S7 is less than 100% (for example, 95%) and the progress rate in the process of the current step S7 is 100%, the processor 311 determines that the second progress is in the predetermined state. In addition, the processor 311 determines that the second progress is the predetermined state also when the progress rate in the process of step S7 that is executed for the first time is 100%.

Figure 2:
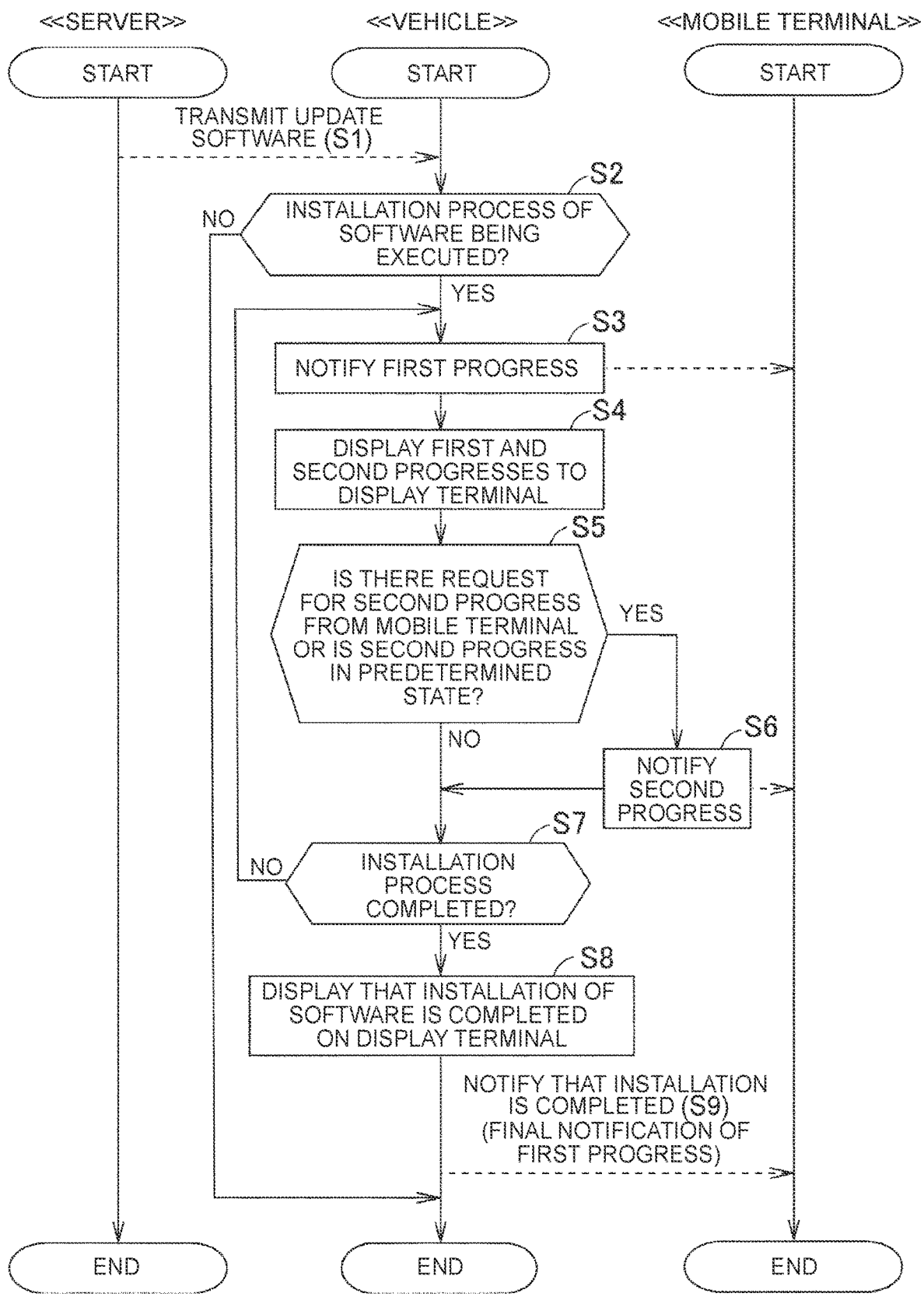
FIG. 2 is a sequence diagram showing a notification control method according to the first embodiment.

The order of the processes of steps S3 to S6 is not limited to the example in FIG. 2. For example, the above processes may be performed concurrently with each other.

In step S7, the processor 311 determines whether the installation of the update software is completed. In other words, the processor 311 determines whether the first progress (progress rate) is 100%. When the installation of the update software is completed (Yes in S9), the process proceeds to step S10. When the installation of the update software is not completed (No in S9), the process returns to step S3.

In step S8, the processor 311 displays on the display terminal 320 of the vehicle 300 information that the installation of the update software is completed.

In step S9, the processor 311 notifies the communication unit 403 of the mobile terminal 400 through the communication unit 313 that the installation of the update software is completed. That is, in step S9, the processor 311 performs a final notification of the first progress to the mobile terminal 400. As a result, the notification frequency of the second progress (second frequency) is reliably lower than the notification frequency of the first progress (first frequency).

Note that the sequence shown in FIG. 2 is merely an example, and is not limited to this. For example, a sequence may be adopted in which executing the notification process of the second progress (S6) is restricted based on the notification frequency of the second progress (second frequency).

As described above, in the first embodiment, the processor 311 of the ECU 310 performs control to notify the mobile terminal 400 of the first progress in the update process of the software used in the ECU 310 at the first frequency, and performs control to notify the mobile terminal 400 of the second progress at the second frequency lower than the first frequency. As a result, while the frequency at which the vehicle 300 notifies the mobile terminal 400 of the first progress (first frequency) is maintained, it is possible to make the frequency at which the vehicle 300 notifies the mobile terminal 400 of the second progress (second frequency) relatively low. Therefore, it is possible to relatively suppress an increase in power consumption due to communication between the vehicle 300 and the mobile terminal 400.

Second Embodiment

Figure 3:
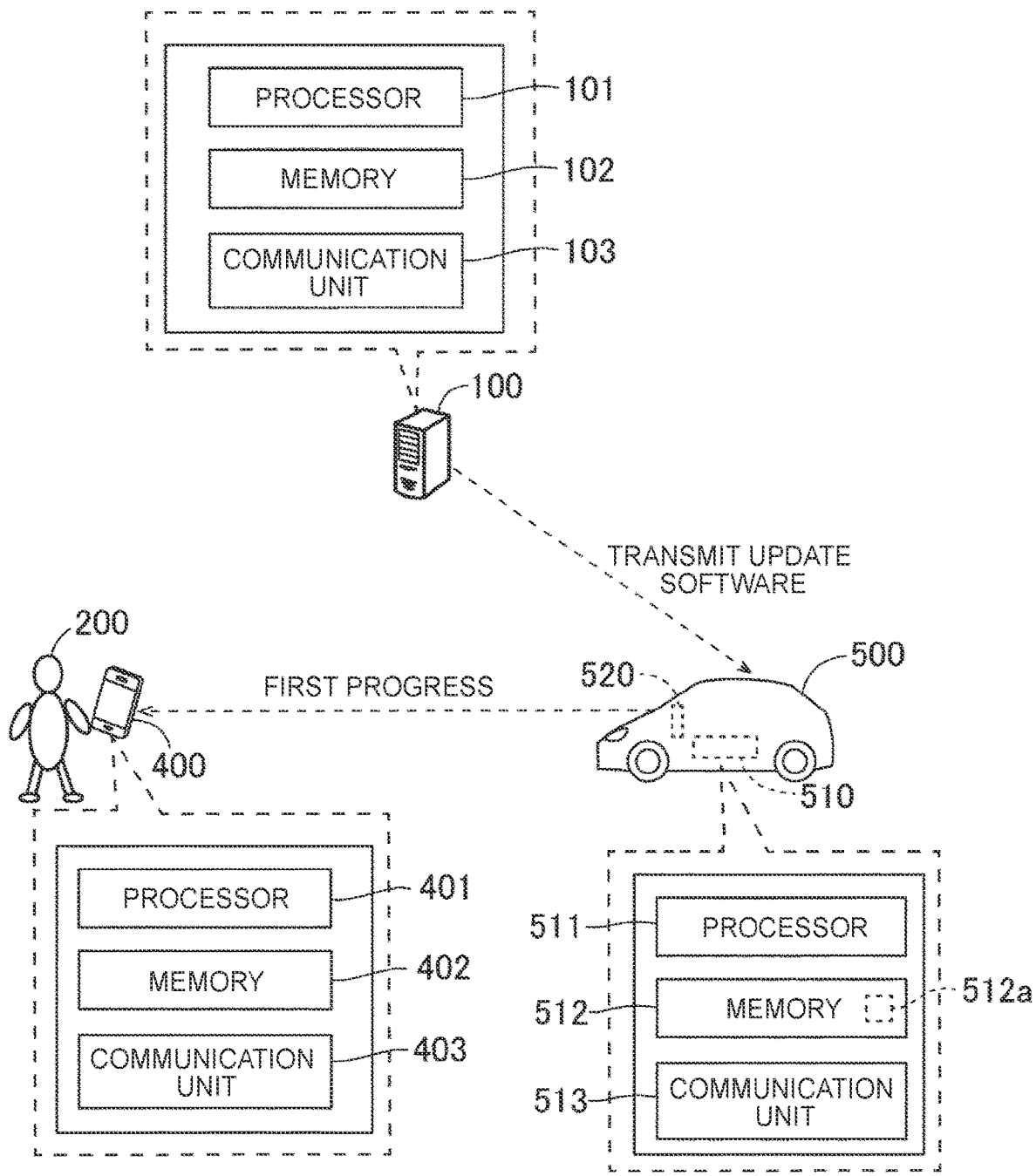
FIG. 3 is a diagram showing a configuration of a notification system according to a second embodiment.
Figure 4:
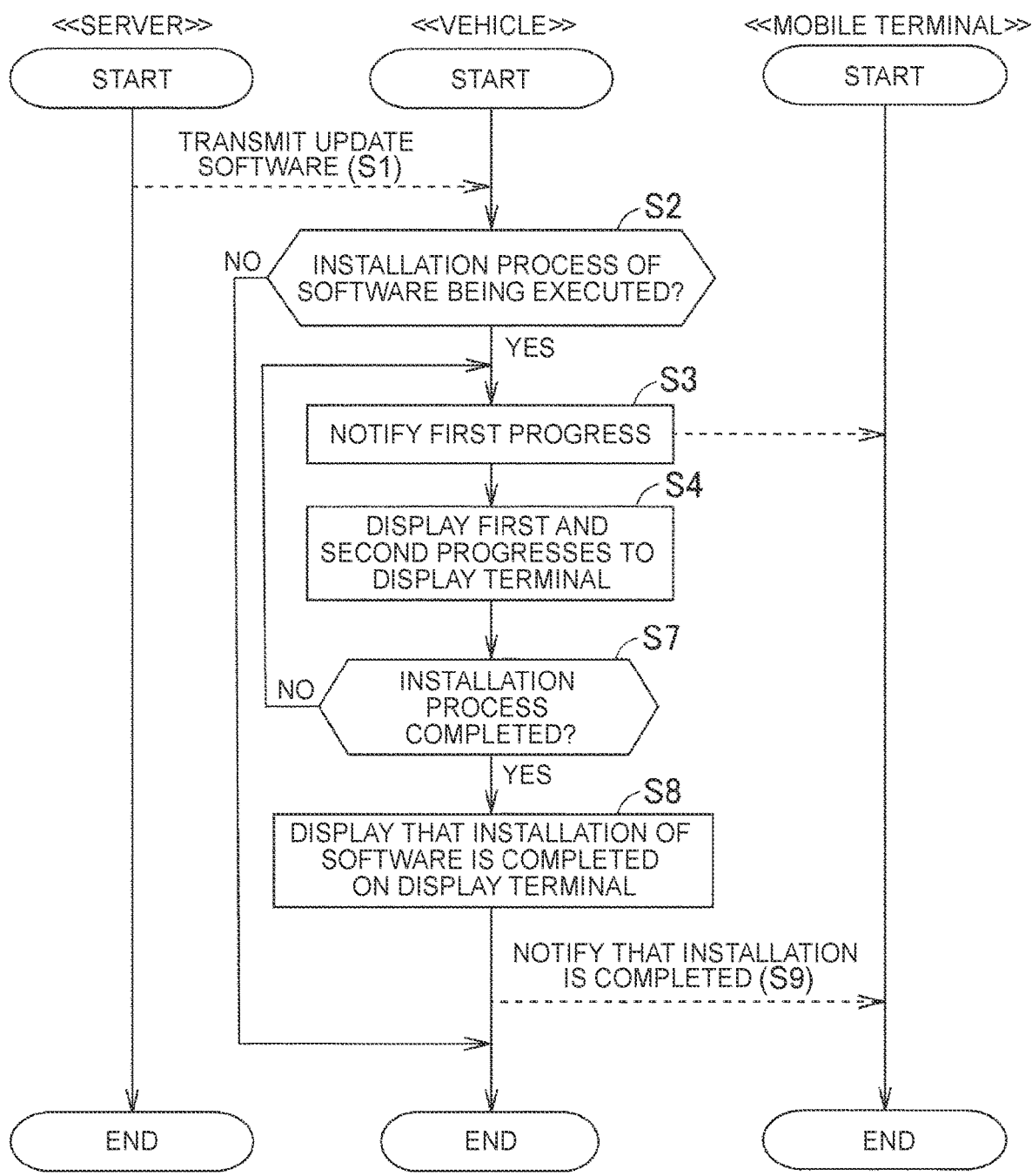
FIG. 4 is a sequence diagram showing a notification control method according to the second embodiment.

With reference to FIG. 3 and FIG. 4, a second embodiment of the present disclosure will be described. In the second embodiment, the vehicle does not notify the mobile terminal of the second progress. The same configurations and processes (steps) as those of the first embodiment are denoted by the same reference signs and will not be described repeatedly.

FIG. 3 is a diagram showing a configuration of a notification system 2 according to the second embodiment. The notification system 2 includes a server 100, a vehicle 500 of a user 200, and a mobile terminal 400 of the user 200.

The vehicle 500 is equipped with an ECU 510. The ECU 510 includes a processor 511, a memory 512, and a communication unit 513. The memory 512 stores a program to be executed by the processor 511 as well as information used in the program (for example, maps, formulas, and various parameters). Further, the vehicle 500 includes a display terminal 520. The ECU 510 may include one or more processors. The ECU 510 may include one or more memories.

In the second embodiment, the processor 511 performs control to notify the vehicle 500 of the second progress without notifying the mobile terminal 400. In other words, the vehicle 500 performs notification of the second progress by a notification unit such as the display terminal 520 without performing notification the mobile terminal 400. Therefore, the notification frequency of the second progress to the mobile terminal 400 by the processor 511 is zero. The processor 511 notifies the mobile terminal 400 of only the first progress among the first progress and the second progress.

The control in the processor 511 is performed by the processor 511 reading and executing a program 512a stored in the memory 512. Although the program 512a itself does not physically exist, the program in the memory 512 is indicated by a reference sign (512a) in FIG. 1 for easy understanding.

FIG. 4 is a sequence diagram showing a notification control method of the above progresses according to the second embodiment. As shown in FIG. 4, the sequence according to the second embodiment is obtained by omitting the processes of steps S5 and S6 of the sequence according to the first embodiment shown in FIG. 2.

In the second embodiment as described above, the processor 511 of the ECU 510 performs control to notify the vehicle 500 of the second progress without notifying the mobile terminal 400. As a result, the frequency at which the mobile terminal 400 is notified of the second progress can be lowered compared to the frequency in the first embodiment. Therefore, it is possible to further suppress an increase in power consumption due to communication between the vehicle 500 and the mobile terminal 400.

In the first embodiment described above, an example is shown in which the second progress is transmitted to the mobile terminal 400 when the second progress reaches a predetermined progress rate (100% in the above embodiment). However, the present disclosure is not limited to this. For example, the second progress may be transmitted to the mobile terminal 400 when the second progress does not change for a predetermined time or more.

In the first embodiment described above, an example in which the second progress is notified to the mobile terminal 400 when a predetermined condition regarding the second progress is satisfied is shown, but the present disclosure is not limited to this. In the first embodiment, the predetermined condition need not be provided, and the process of step S3 may be performed N times while the process of step S5 (see FIG. 2) may be performed N−1 times or less in the sequence. For example, a sequence may be adopted in which the process proceeds to step S4 after the process of step S3 is continuously performed multiple times.

The embodiments disclosed herein should be considered as exemplary in all respects and not restrictive. The scope of the present disclosure is indicated by the claims rather than the description of the embodiments above, and is intended to include all modifications within the meaning and scope equivalent to the scope of the claims.

What is claimed is:

1. A vehicle of a user that is equipped with an electronic control unit, the vehicle comprising one or more processors configured to:
   communicate with an information processing device of the user;
   perform notification of a plurality of progresses in an update process of software used in the electronic control unit;
   notify the information processing device of a first progress among the progresses, the notifications provided at a first frequency; and
   notify the information processing device of a second progress among the progresses, the notifications provided at a second frequency, the second progress being different from the first progress, the second frequency being lower than the first frequency.

2. The vehicle according to claim 1, wherein the one or more processors are configured to, when the second progress reaches a predetermined state, the information processing device that the second progress is in the predetermined state.

3. The vehicle according to claim 1, wherein the one or more processors are configured to notify the information processing device of the second progress in response to a request from the information processing device.

4. The vehicle according to claim 1, wherein the second frequency is zero times.

5. A system comprising:
   an information processing device of a user; and
   a vehicle of the user that is equipped with an electronic control unit, the vehicle being configured to
   communicate with the information processing device,
   notify the vehicle of a plurality of progresses in an update process of software used in the electronic control unit,
   notify the information processing device of a first progress among the progresses at a first frequency, and
   notify the information processing device of a second progress among the progresses at a second frequency, the second progress being different from the first progress, the second frequency being lower than the first frequency.

6. The system according to claim 5, wherein the vehicle is configured to, when the second progress reaches a predetermined state, perform control for notifying the information processing device that the second progress is in the predetermined state.

7. The system according to claim 5, wherein the vehicle is configured to notify the information processing device of the second progress in response to a request from the information processing device.

8. A notification control method for controlling a notification of a plurality of progresses in an update process of software used in an electronic control unit of a vehicle of a user, the notification control method comprising:
   notifying the vehicle of the progresses;
   notifying an information processing device of the user, of a first progress among the progresses at a first frequency from the vehicle; and notifying the information processing device of a second progress among the progresses at a second frequency from the vehicle, the second progress being different from the first progress, the second frequency being lower than the first frequency.

9. A non-transitory storage medium that stores an instruction to cause a vehicle to execute a function as the vehicle according to claim 1.

* * * * *